US011943579B2

(12) United States Patent
Voishvillo et al.

(10) Patent No.: US 11,943,579 B2
(45) Date of Patent: Mar. 26, 2024

(54) DUAL COMPRESSION DRIVER WITH CONE DIAPHRAGM

(71) Applicant: Harman International Industries, Incorporated, Stamford, CT (US)

(72) Inventors: Alexander Voishvillo, Simi Valley, CA (US); Brian Cummins McLaughlin, Pasadena, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 17/806,709

(22) Filed: Jun. 13, 2022

(65) Prior Publication Data

US 2023/0403499 A1 Dec. 14, 2023

(51) Int. Cl.
*H04R 1/28* (2006.01)
*H04R 7/12* (2006.01)

(52) U.S. Cl.
CPC ........... *H04R 1/2865* (2013.01); *H04R 7/127* (2013.01); *H04R 2400/13* (2013.01)

(58) Field of Classification Search
CPC ... H04R 1/2865; H04R 7/127; H04R 2400/13
See application file for complete search history.

(56) References Cited

U.S. PATENT DOCUMENTS 4,283,606 A 8/1981 Buck
4,619,342 A 10/1986 Buck
8,280,091 B2 * 10/2012 Voishvillo .............. H04R 1/345 381/343
8,831,270 B1 * 9/2014 Dimitrov ................. H04R 1/30 381/401

FOREIGN PATENT DOCUMENTS

EP 3474569 A1 4/2019
GB 701395 A 12/1953

OTHER PUBLICATIONS

Voishvillo, A., "Dual Diaphragm Compression Drivers," Proceedings of the 131st Convention of the Audio Engineering Society, Convention Paper 8502, Oct. 20, 2011, New York, New York, 12 pages.
Espi, A. et al., "Study of the interaction between radiating systems in a coaxial loudspeaker," Proceedings of the 133rd Convention of the Audio Engineering Society, Convention Paper 8724, Oct. 26, 2012, San Francisco, California, 11 pages.

(Continued)

*Primary Examiner* — Sunita Joshi
(74) *Attorney, Agent, or Firm* — McCoy Russell LLP

(57) ABSTRACT

Systems and methods are herein described for a coaxial loudspeaker. The loudspeaker may comprise a compression driver having a first diaphragm assembly including a first magnet, and a first diaphragm coupled to a first voice coil, and a second diaphragm assembly including a second magnet and a second diaphragm coupled to a second voice coil. The compression driver may further comprise a third diaphragm assembly including a third diaphragm coupled to a third voice coil.

14 Claims, 10 Drawing Sheets

(56) References Cited

OTHER PUBLICATIONS

Dimitrov, D., “Single Permanent Magnet Loudspeakers,” Proceedings of the 134th Convention of the Audio Engineering Society, Convention Paper 8847, May 4, 2013, Rome, Italy, 6 pages.
Mäkivirta, A. et al., “The Acoustic Design of Minimum Diffraction Coaxial Loudspeakers with Integrated Waveguides,” Proceedings of the 142nd Convention of the Audio Engineering Society, Convention Paper 9695, May 20, 2017, Berlin, Germany, 12 pages.
Bartolozzi, F. et al., “Acoustic Decoupling Device in Coaxial Compression Driver,” Proceedings of the 151st Convention of the Audio Engineering Society, Convention e-Brief 662, Oct. 13, 2021, New York, New York, 4 pages.
European Patent Office, Extended European Search Report Issued in Application No. 23173846.9, dated Nov. 6, 2023, Germany, 9 pages.

* cited by examiner

DUAL COMPRESSION DRIVER WITH CONE DIAPHRAGM

FIELD

The disclosure relates to electro-acoustical drivers and loudspeakers employing electro-acoustical drivers. More particularly, the disclosure relates to a coaxial loudspeaker with a dual compression driver and a cone diaphragm.

BACKGROUND

An electro-acoustical transducer or driver is utilized as a loudspeaker or as a component in a loudspeaker system to transform electrical signals into acoustical signals. A driver receives electrical signals and converts the electrical signals to acoustic signals. The driver typically includes mechanical, electromechanical, and magnetic elements to effect this conversion. Sound reproduction includes converting an electrical signal into an acoustic signal. The acoustic signal is radiated by a diaphragm, the movements of which induce variations of pressure in the surrounding air, which then propagate within space under the form of an acoustic wave. In an electro-acoustical transducer or driver, the diaphragm is displaced by a movable voice coil including a solenoid wire surrounded by a magnetic field and run by an electrical current (e.g., from an amplifier). Interactions between the electrical current and the magnetic field may induce displacement of the movable voice coil, which in turn drives the diaphragm, the vibrations of which provide acoustical radiation.

By convention, an audio range (e.g., sounds on a frequency range) includes a "low range", which designates a range of frequencies between 20 Hz and 200 Hz, a "mid-range", which designates a range of frequencies between 200 Hz and 2,000 Hz (e.g., 2 kHz), and a "high range", which designates a range of frequencies between 2,000 Hz and 20,000 Hz (e.g., 20 kHz). There exist transducers which may reproduce each of the low range, the mid-range, and the high range frequencies, as well as transducers which may reproduce multiple ranges of the full audio range. For example, a direct-radiating cone diaphragm-based transducer may reproduce audio in the low-mid range and a compression driver may reproduce audio in the high range. A dual compression driver may be an embodiment of a compression driver which may reproduce audio in the high range and increase power handling, lower thermal compression, provide a smoother frequency response, and decrease non-linear distortion and sub-harmonics, compared to a conventional single compression driver.

It is desirable to design a loudspeaker which may reproduce the full audio range, including the low range, the mid-range, and the high range. This may be achieved by combining several transducers on a single loudspeaker. For example, a loudspeaker may include a first transducer capable of reproducing low and low-medium frequencies and a second transducer capable of reproducing high-medium and high frequencies. The transducers may be mounted on a same loudspeaker enclosure, for example, on a same face. Further, transducers may be mounted in axial alignment, which may be referred to as transducers of a coaxial loudspeaker.

Designing a coaxial loudspeaker which includes a direct-radiating cone diaphragm-based transducer for reproducing sounds in the low-mid range and a dual compression driver for reproducing sounds in the high range may present various challenges. For example, coupling a conventional dual compression driver to a conventional cone diaphragm transducer may result in a coaxial loudspeaker having three magnets: a first magnet and a second magnet of the dual compression driver and a third magnet of the cone diaphragm transducer. This embodiment may have a complex configuration, as well as may have an elevated production cost due to inclusion of three magnets, compared to a coaxial loudspeaker including a single compression driver and a cone diaphragm transducer.

SUMMARY

Embodiments are disclosed herein for a two-way coaxial loudspeaker in which a dual compression driver and a direct-radiating cone diaphragm-based transducer are used to reproduce low, mid-, and high range frequencies of the audio range. The loudspeaker may comprise a compression driver (e.g., the dual compression driver) having a first diaphragm assembly including a first magnet, and a first diaphragm coupled to a first voice coil, and a second diaphragm assembly including a second magnet, and a second diaphragm coupled to a second voice coil. The loudspeaker may further comprise a third diaphragm assembly including a third diaphragm (e.g., a direct-radiating cone diaphragm) coupled to a third voice coil.

The dual compression driver may be axially coupled to the third diaphragm in such a way that a first permanent magnetic field generated by the first magnet of the dual compression driver may drive the first diaphragm to reproduce sounds in the high range. A second permanent magnetic field generated by the second magnet of the dual compression driver may drive the second diaphragm to reproduce sounds in the high range and may further drive the third diaphragm to reproduce sounds in the low-mid range. The loudspeaker may therefore use two magnets (e.g., the first magnet and the second magnet) to reproduce sound in the low, mid-, and high range, where the first magnet is used to reproduce sound in the high range and the second magnet is used to reproduce sound in the low-mid and high range.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
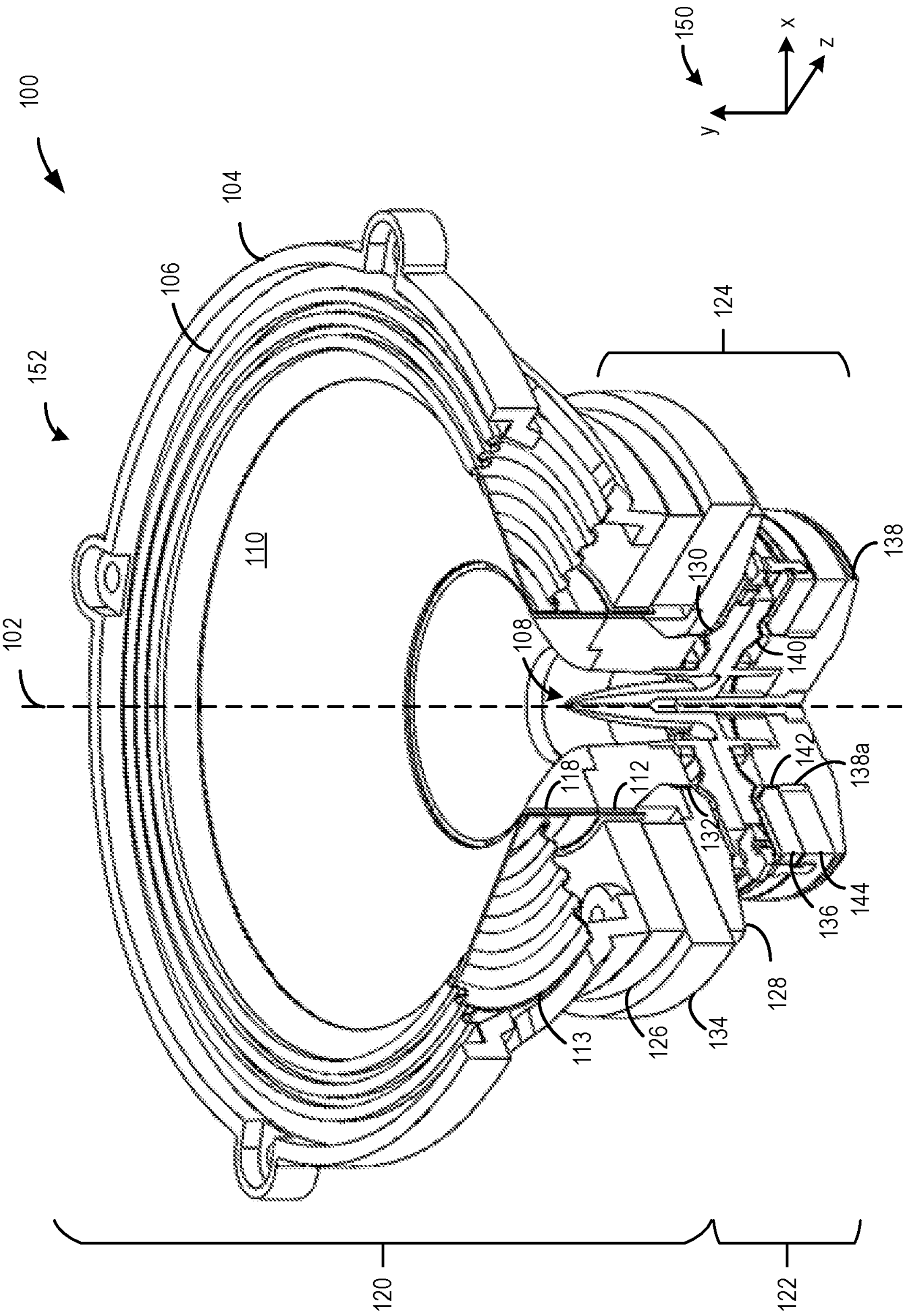
FIG. 1 shows a cutaway perspective view of a coaxial loudspeaker, in accordance with one or more embodiments of the present disclosure.
Figure 2:
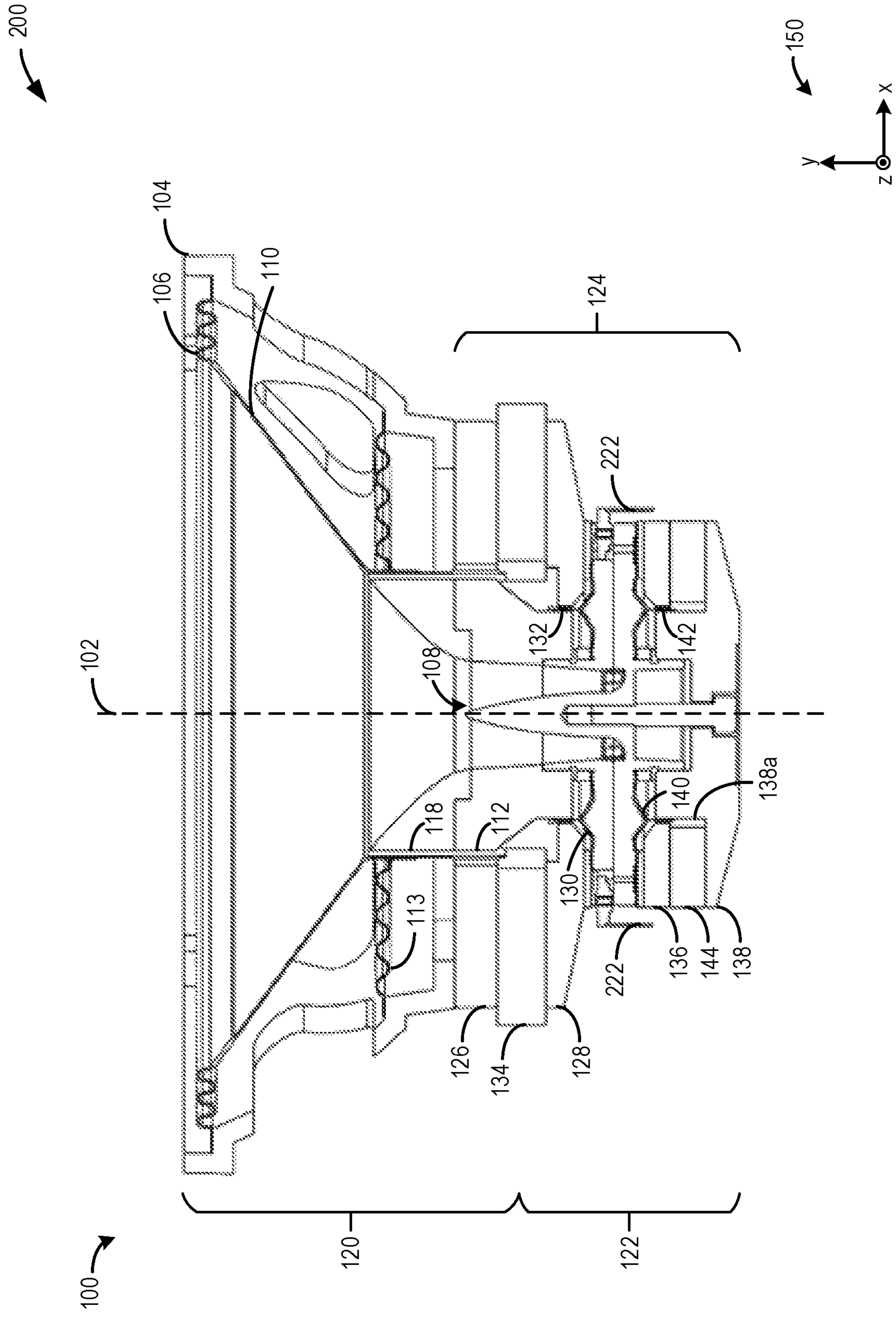
FIG. 2 shows a cross-sectional view of the coaxial loudspeaker, in accordance with one or more embodiments of the present disclosure.
Figure 5:
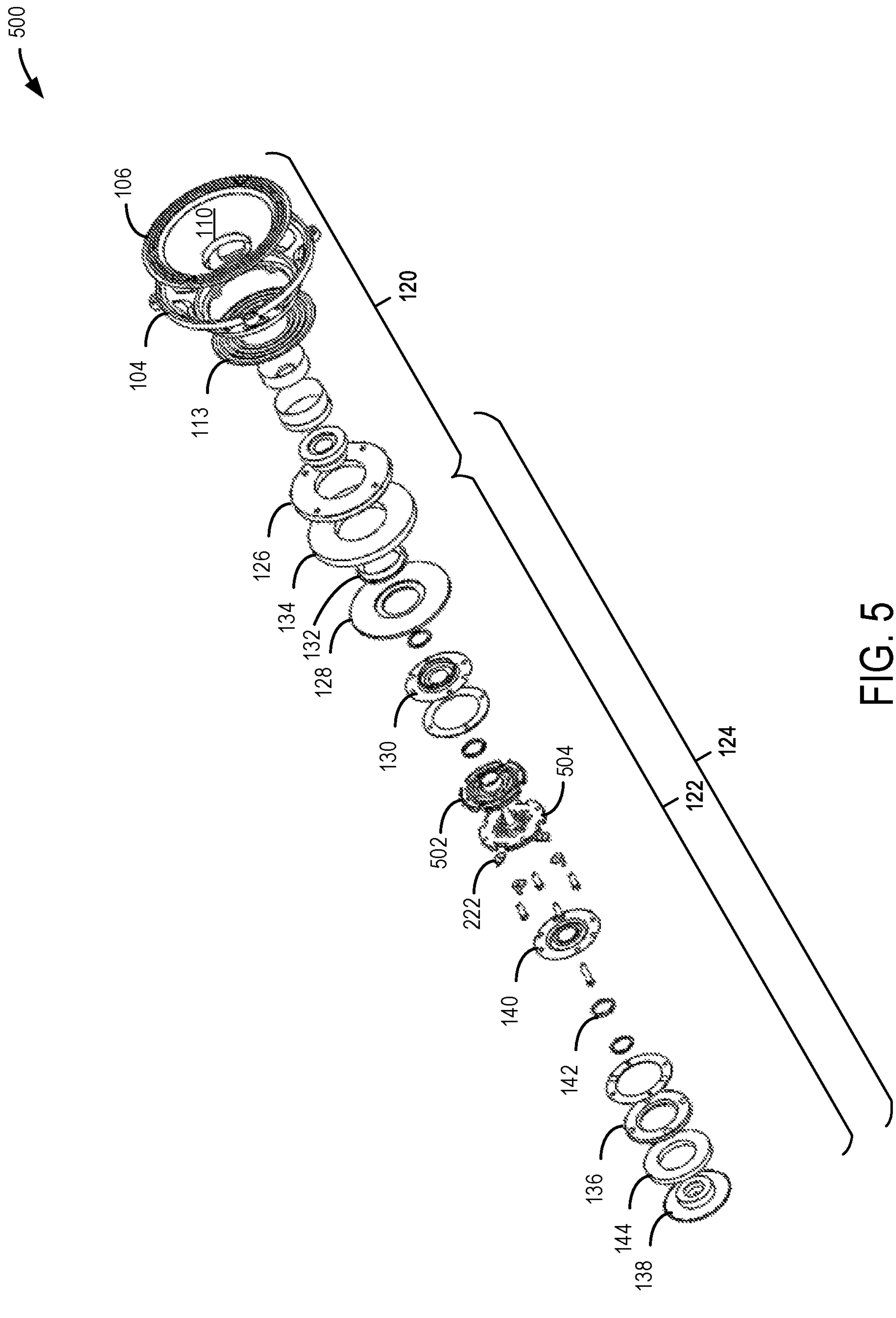
FIG. 5 shows an exploded view of elements of the coaxial loudspeaker, in accordance with one or more embodiments of the present disclosure.
Figure 6:
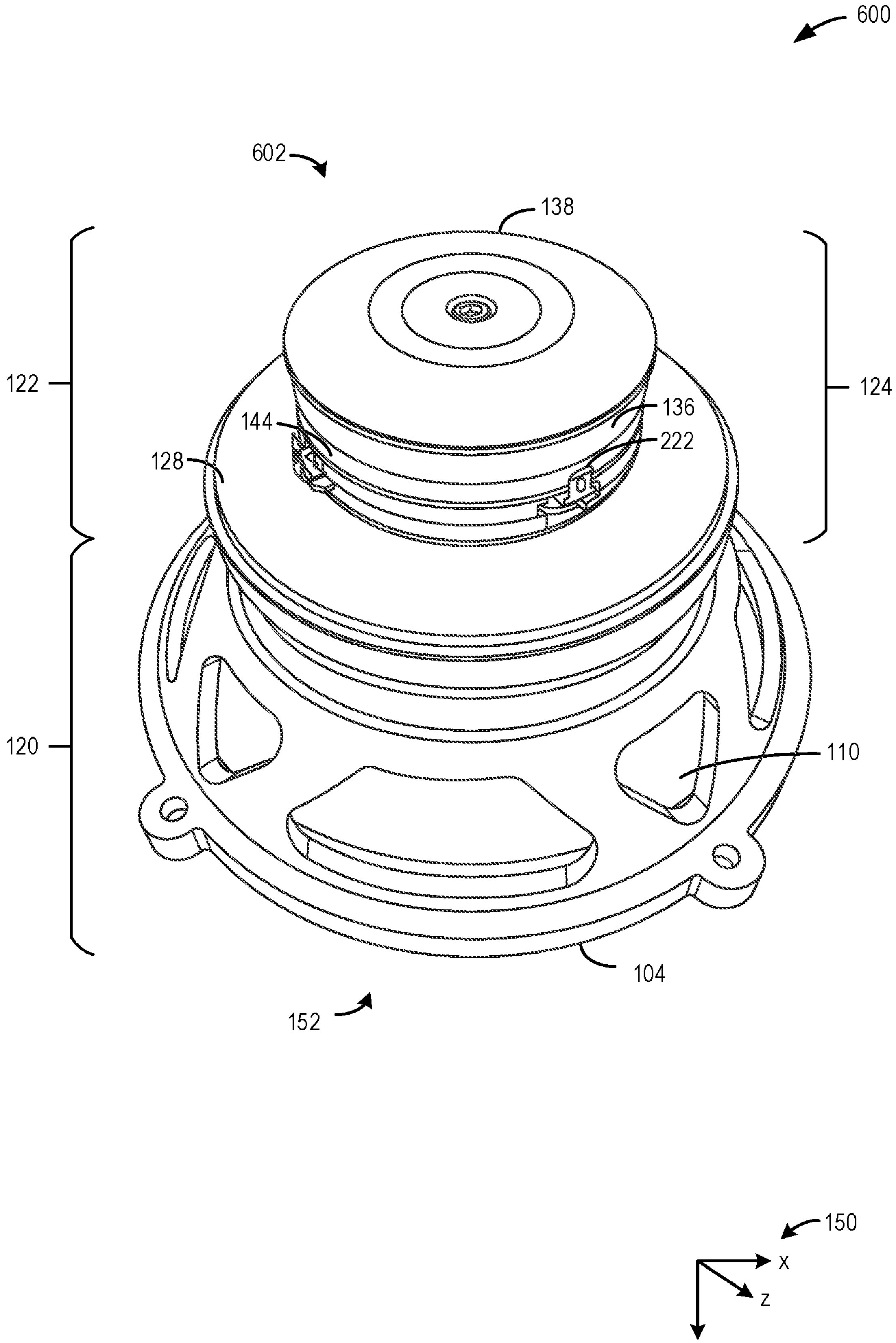
FIG. 6 shows a first perspective view of an embodiment of the coaxial loudspeaker, in accordance with one or more embodiments of the present disclosure.
Figure 7:
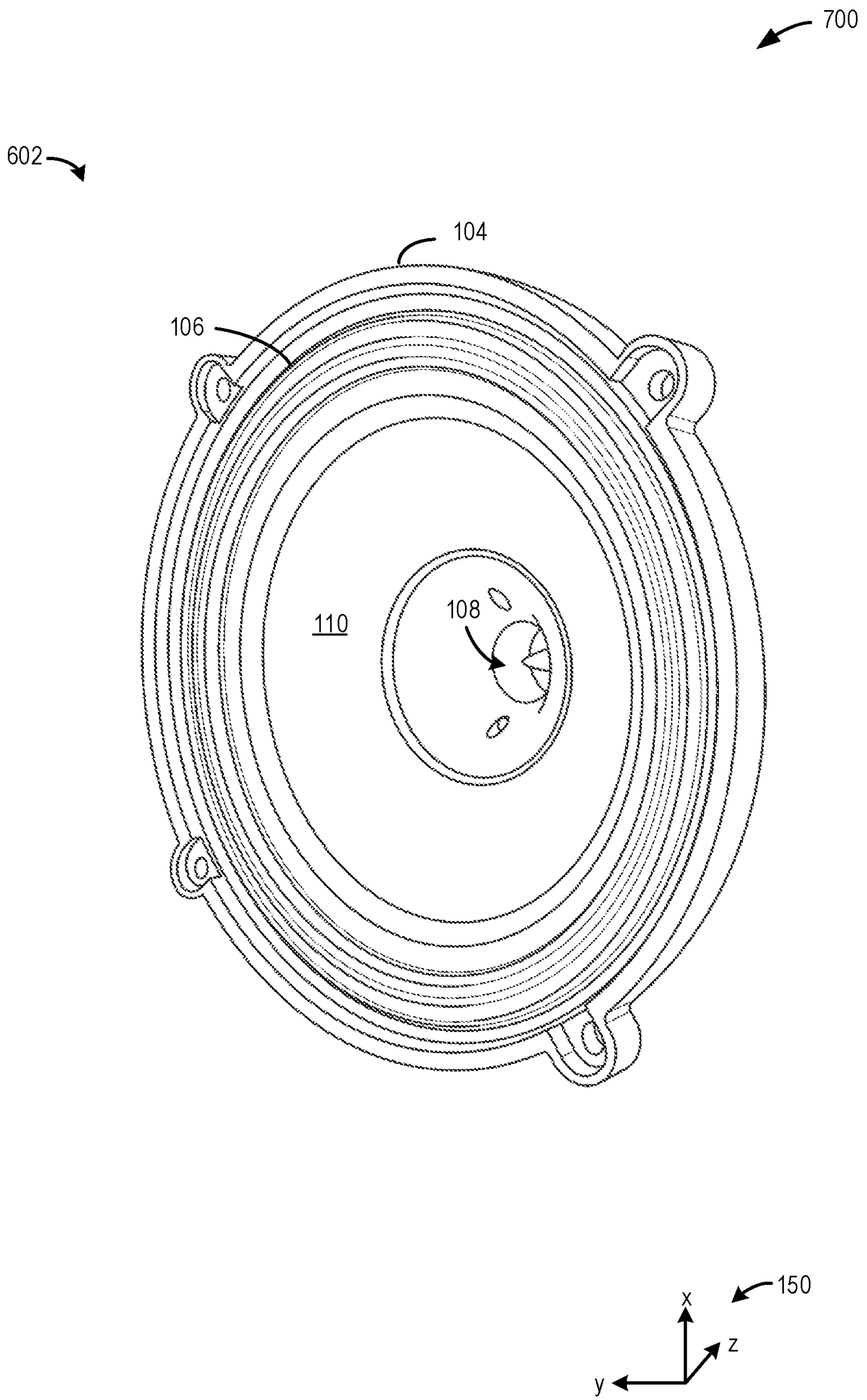
FIG. 7 shows a second perspective view of the embodiment of the coaxial loudspeaker, in accordance with one or more embodiments of the present disclosure.
Figure 8:
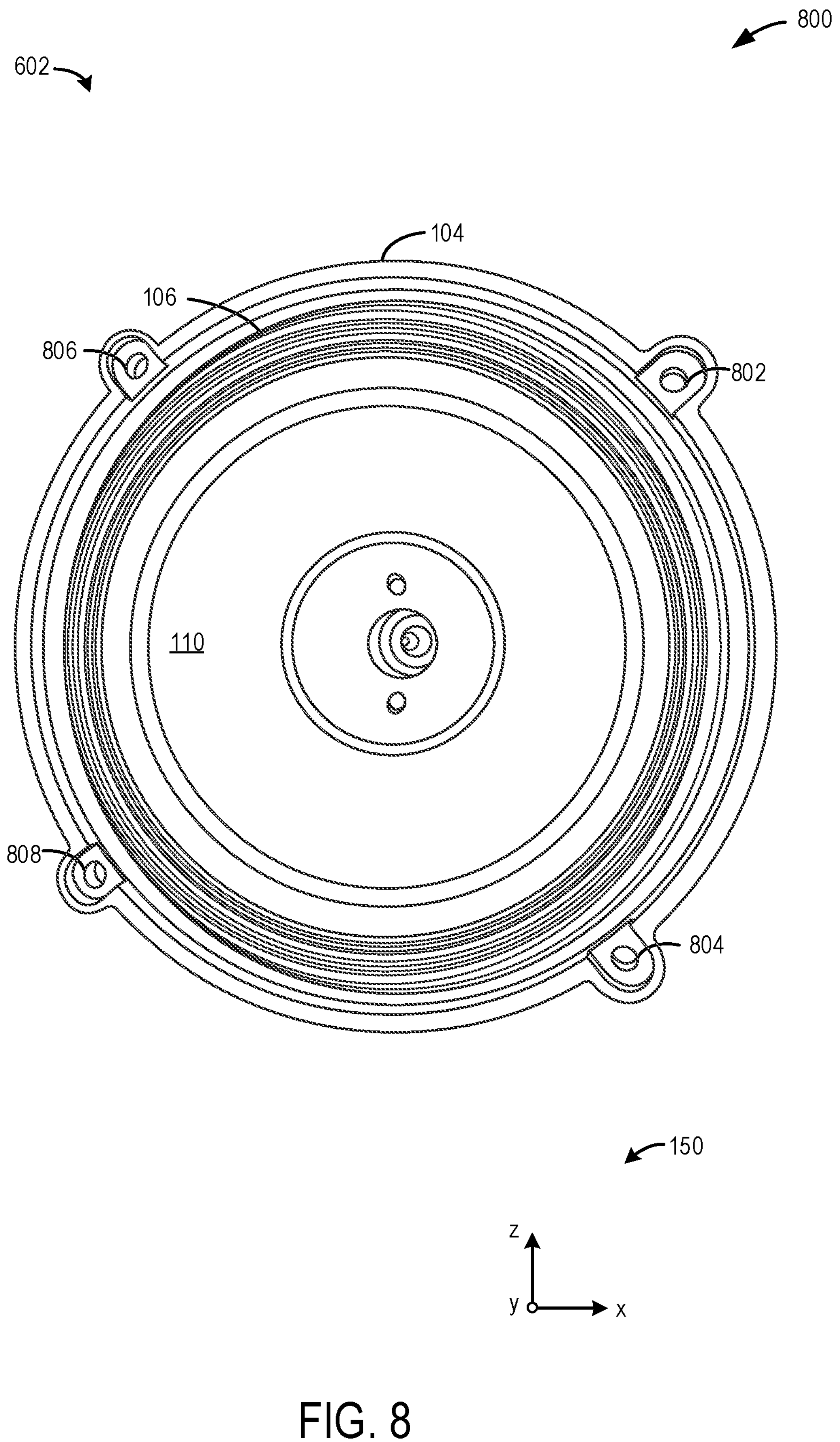
FIG. 8 shows a top-down view of the embodiment of the coaxial loudspeaker, in accordance with one or more embodiments of the present disclosure.

Herein described are systems and methods for a coaxial loudspeaker configured to reproduce sounds in low, mid-, and high frequency audio ranges using three diaphragms, three voice coils, and two magnets. A perspective view of a first embodiment of the coaxial loudspeaker is shown in FIG. 1. An expanded view of elements of the first embodiment of the coaxial loudspeaker is shown in FIG. 5. Perspective views of a second embodiment of the coaxial loudspeaker are shown in FIGS. 6-8. A first diaphragm and a second diaphragm may be configured to reproduce sounds in the high frequency audio range and a third diaphragm may be configured to reproduce sounds in the low-mid frequency audio range. For example, the first diaphragm and the second diaphragm may be annular diaphragms and the third diaphragm may be a cone diaphragm. Each of the three diaphragms is coupled to a respective voice coil, which may be positioned along a central axis (e.g., a central linear axis) of the coaxial loudspeaker. A cross-sectional view of the first embodiment of the coaxial loudspeaker is shown in FIG. 2, including positioning of the two magnets, three diaphragms, and three voice coils. A first voice coil may be positioned in proximity to a first magnet and coupled to the first diaphragm. A second voice coil may be positioned in proximity to a second magnet and coupled to the second diaphragm. A third voice coil may also be positioned in proximity to the second magnet and be coupled to the third diaphragm. The first magnet may generate a first magnetic field and the second magnet may generate a second magnetic field, where each of the first magnetic field and the second magnetic field may be permanent magnetic fields, in some embodiments.

Figure 3A:
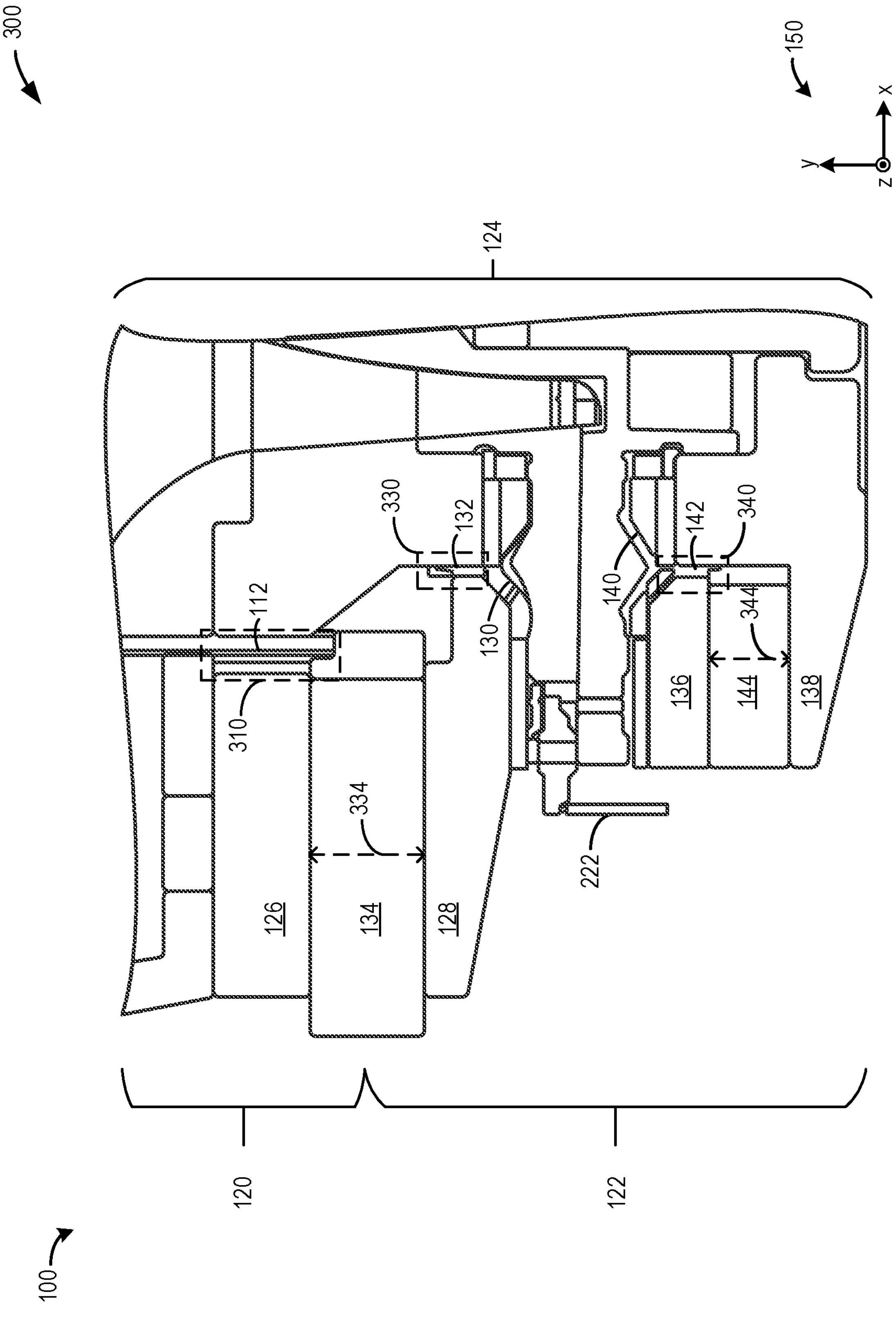
FIG. 3A shows a cross-sectional view of a dual compression driver of the coaxial loudspeaker, in accordance with one or more embodiments of the present disclosure.
Figure 3B:
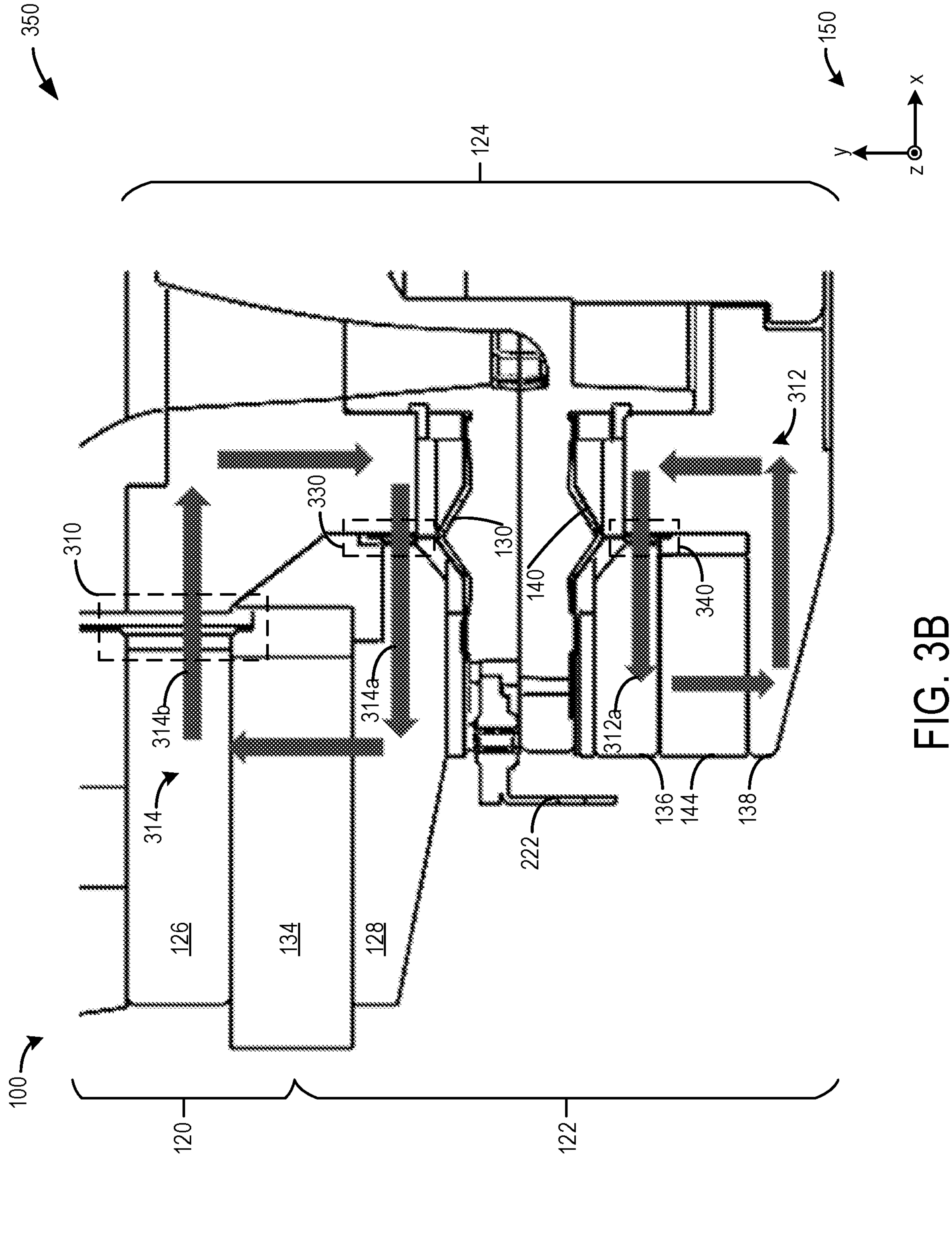
FIG. 3B shows magnetic fields overlaid on the cross-sectional view of the dual compression driver, in accordance with one or more embodiments of the present disclosure.
Figure 4:
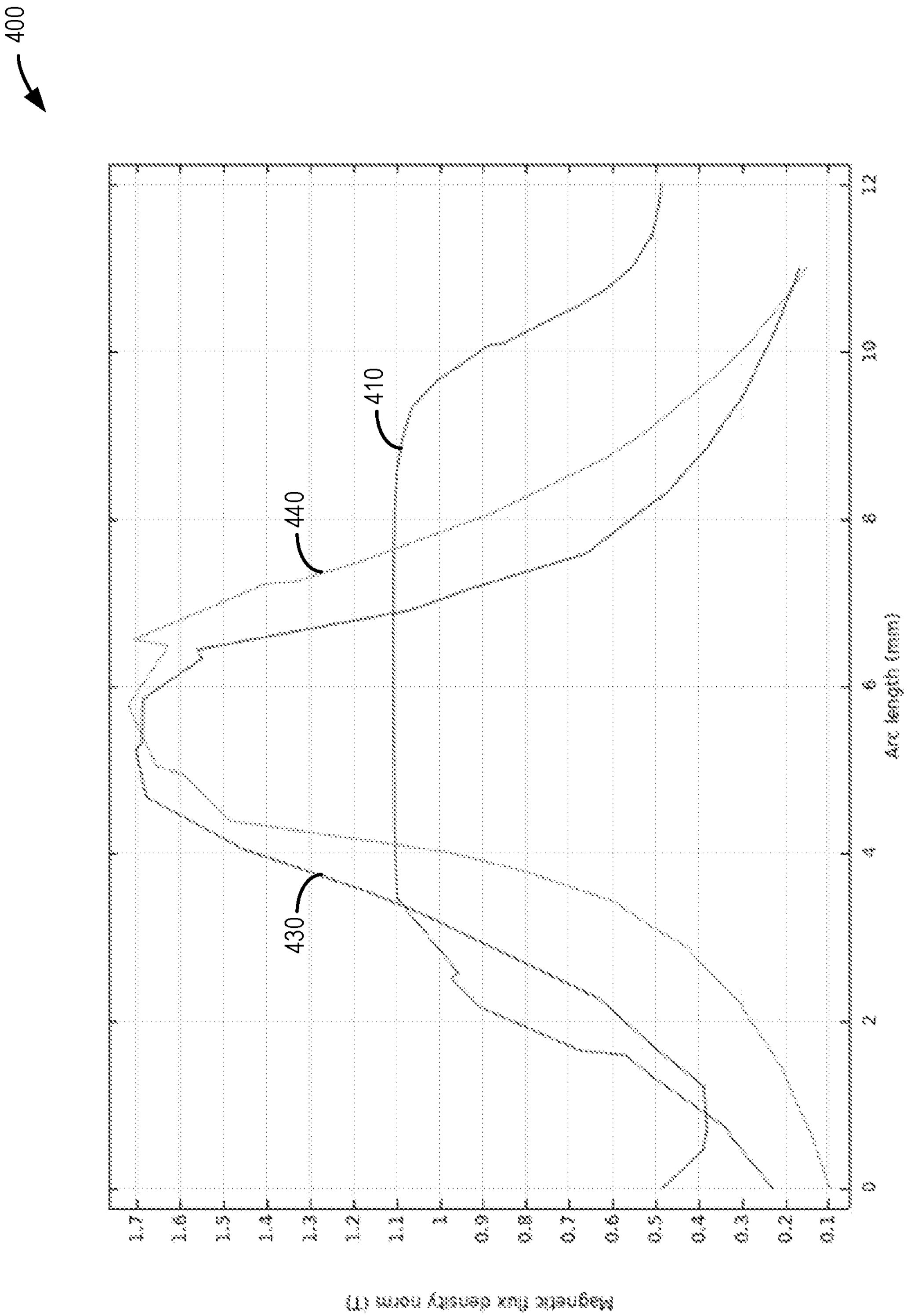
FIG. 4 shows a graph illustrating magnetic flux density for different arc lengths in voice coil gaps of the dual compression driver, in accordance with one or more embodiments of the present disclosure.
Figure 9:
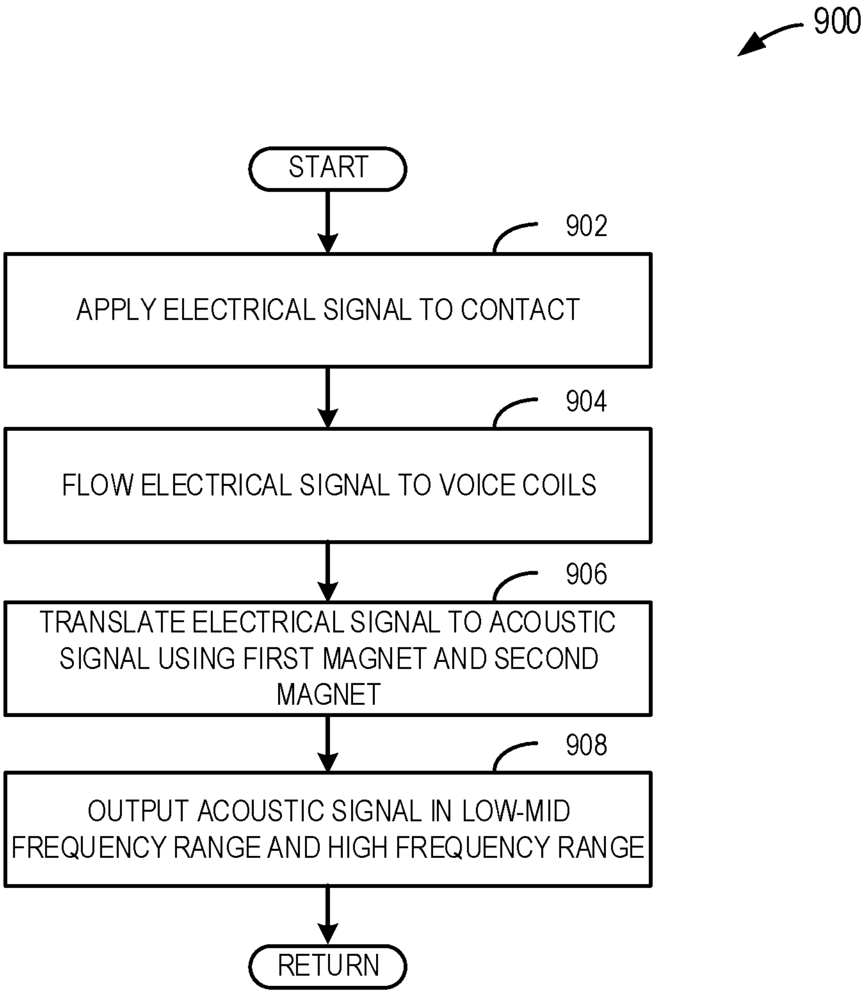
FIG. 9 illustrates a method for the coaxial loudspeaker of FIGS. 1-8.

FIG. 9 illustrates a method for the coaxial loudspeaker of FIGS. 1-8. Electric signals may be provided to connectors of the loudspeaker, which may energize each of the first voice coil, the second voice coil, and the third voice coil, creating an induced magnetic field at each of the three voice coils. For example, when energized, the first voice coil may have a first induced magnetic field, the second voice coil may have a second induced magnetic field, and the third voice coil may have a third induced magnetic field. Each of the three voice coils may be positioned in such a way, relative to a respective magnet of the two magnets, that the induced magnetic field interacts with the permanent magnetic field. FIGS. 3A and 3B show positioning of the three voice coils with respect to the permanent magnetic fields for the first embodiment of the coaxial loudspeaker. For example, the first induced magnetic field may interact with the first permanent magnetic field, the second induced magnetic field may interact with the second permanent magnetic field, and the third induced magnetic field may interact with the second permanent magnetic field. FIG. 4 shows a graph illustrating magnetic flux density for different arc lengths in voice coil gaps (e.g., regions where an induced magnetic field interacts with a respective permanent magnetic field), including a first voice coil gap of the first voice coil, a second voice coil gap of the second voice coil, and a third voice coil gap of the third voice coil. Interaction of the permanent magnetic field with the induced magnetic field may cause motion (e.g., oscillation) of the respective voice coil along the central axis and, in turn, oscillation of the coupled diaphragm along the central axis.

Oscillation of the coupled diaphragm may convert the electrical signal into acoustic signals, which may be interpreted as audible sound by a listener. As described above, a configuration of a diaphragm may dictate a reproducible frequency range. For example, oscillation of the first diaphragm and the second diaphragm may produce acoustic signals in the high range and oscillation of the third diaphragm may produce acoustic signals in the low-mid range. In this way, two magnets, three diaphragms, and three voice coils may be used to reproduce an acoustic signal range including signals in the low, mid-, and high ranges. The herein described coaxial loudspeaker may therefore have a less complex configuration and be less costly to produce, compared to coaxial loudspeakers which employ three magnets to reproduce the acoustic signals in the low, mid-, and high ranges.

FIGS. 1-3B, 5 are drawn approximately to scale however, other relative component dimensions may be used, in other embodiments. An axis system 150 is provided in FIGS. 1-3B, 6-8 for reference. The y-axis may be a vertical axis (e.g., parallel to a gravitational axis), the x-axis may be a lateral axis (e.g., horizontal axis), and the z-axis may be a longitudinal axis, in one example. However, the axes may have other orientations, in other examples.

FIG. 1 illustrates a 90-degree cutaway view of a coaxial loudspeaker 100 including a dual compression driver and a direct-radiating cone diaphragm configured to reproduce a high frequency spectrum and a low-mid frequency spectrum, respectively. Acoustic signals in the high frequency spectrum may be herein referred to as being in the high frequency range and/or as being a high frequency sound. Acoustic signals in the low-mid frequency spectrum may be herein referred to as being in the low-mid frequency range and/or as being a low-mid frequency sound. Various elements of the coaxial loudspeaker 100 may be disposed generally about a central axis 102 (e.g., a central linear axis). For descriptive purposes, some components are described as being "front" components while other components are described as being "rear components". Relative to rear components, front components are generally closer to an output side 152 of the coaxial loudspeaker 100 at which sound waves emanate. It will be understood, however, that the terms "front" and "rear" in this context are not intended to limit the coaxial loudspeaker 100 to any particular orientation in space. The coaxial loudspeaker 100 is herein described in terms of a low-mid section 120, which may reproduce the low-mid frequency spectrum, and a high frequency section 122, which may reproduce the high frequency spectrum.

A dual compression driver 124 may be configured with a first driver assembly and a second driver assembly for reproducing sounds in the high frequency spectrum. For example, the dual compression driver 124 may be provided by combining two single compression drivers into a single unit that includes two magnets, two diaphragms, and two voice coils with a single exit for sound output (e.g., a phasing plug 108). The phasing plug 108 may be formed of a front phasing plug and a rear phasing plug, as further described herein. The dual compression driver 124 may span the low-mid section 120 and the high frequency section 122, where the first driver assembly is positioned in the high frequency section 122 and the second driver assembly is positioned at an interface between the low-mid section 120 and the high frequency section 122.

The high frequency section 122 includes the first driver assembly, which may include a first magnet 144, a first diaphragm 140, and a first voice coil 142 coupled to the first diaphragm 140. The first diaphragm 140 may be an annular diaphragm configured to reproduce sound in the high frequency range. The first magnet 144 may be positioned between a rear top plate 136 and a rear back plate 138, where the first magnet 144 and the rear top plate 136 are each configured as annular rings. The rear back plate 138 may have a pole piece **138*a* extending along the central axis 102, as further described with respect to FIG. 2. The phasing plug 108 may extend through a center of the first magnet 144 and the rear top plate 136 from the pole piece 138*a* of the rear back plate 138**.

The second driver assembly may span the low-mid section 120 and the high frequency section 122. A second magnet 134 of the second driver assembly may be part of both the low-mid section 120 and the high frequency section 122 and may be positioned between a front top plate 126 (positioned in the low-mid section 120) and a front back plate 128 (positioned in the high frequency section 122). Each of the front top plate 126, the front back plate 128, and the second magnet 134 may be configured as annular rings. The phasing plug 108 may further extend through a center of the second magnet 134, the front top plate 126, and the front back plate 128. The second driver assembly may further include a second diaphragm 130 coupled to a second voice coil 132, both of which are positioned in the high frequency section 122. The second diaphragm 130 may be an annular diaphragm configured to produce sound waves in the high frequency spectrum. In some embodiments, the first diaphragm 140 and the second diaphragm 130 may be equivalent. In other embodiments, the first diaphragm 140 and the second diaphragm 130 may be differently configured to reproduce sound in the high frequency spectrum. Further details of elements of the first driver assembly and the second driver assembly are described with respect to FIG. 2.

As shown in FIG. 1 and further elaborated on with respect to FIGS. 2-3B, the low-mid section 120 may be based on a direct-radiating cone diaphragm transducer, herein referred to as a third driver assembly. The third driver assembly may include a third diaphragm 110 and a third voice coil 112 coupled to the third diaphragm 110. In the embodiment of FIG. 1, the third diaphragm 110 may be coupled to the third voice coil 112 via a voice coil former 118. For example, the third voice coil 112 may be coupled to the voice coil former 118 such that, when a magnetic field is induced on the third voice coil 112, the third voice coil 112 and the voice coil former 118 oscillate axially along the central axis 102 and consequently oscillate the third diaphragm 110. The voice coil former 118 may extend axially (e.g., along the central axis 102) into the second driver assembly (e.g., in the low-mid section 120) and be positioned in a central space of the front top plate 126. The third diaphragm 110 may be a direct-radiating cone diaphragm configured to reproduce sound in the low-mid frequency range. A frame 104 may support the third diaphragm 110 and the third diaphragm 110 may be held in position by a spider 113 and a surround 106. Further detail regarding configurations of the first driver assembly, the second driver assembly, and the third driver assembly are described with respect to FIGS. 2-4.

The first driver assembly, the second driver assembly, and the third driver assembly may be axially aligned along the central axis 102. The dual compression driver 124 may be coupled to the third driver assembly by any suitable means. For example, a front top plate 126 of the low-mid section 120 may be coupled to the frame 104 of the third driver assembly via a bolt-on connection, via a screw-on connection, and so on. When coupled to the dual compression driver 124, the third diaphragm 110 may functionally perform as an axisymmetric horn for the dual compression driver 124.

In this way, the coaxial loudspeaker described with respect to FIG. 1 and further described with respect to FIGS. 2-4 may reproduce both the high frequency spectrum and the low-mid frequency spectrum using two magnets (e.g., the first magnet 144 and the second magnet 134), three diaphragms (e.g., the first diaphragm 140, the second diaphragm 130, and the third diaphragm 110), and three voice coils (e.g., the first voice coil 142, the second voice coil 132, and the third voice coil 112). This configuration may reduce a complexity, a footprint, and a cost of the coaxial loudspeaker 100 compared to a conventional coaxial loudspeaker which may use three magnets to reproduce both the high frequency spectrum and the low-mid frequency, and/or compared to non-coaxial loudspeakers which may use a compression driver to reproduce the high frequency spectrum and a direct-radiating cone diaphragm transducer to reproduce the low-mid frequency spectrum, where the compression driver and the direct-radiating cone diaphragm transducer may not be in axial alignment.

Briefly turning to FIG. 5, an expanded view 500 of elements of the coaxial loudspeaker 100 of FIG. 1 are shown. Elements shown in FIG. 1 as well as other figures described herein are similarly numbered in FIG. 5. As briefly described with respect to FIG. 1, the phasing plug 108 may include a front phasing plug 502 and a rear phasing plug 504. The rear phasing plug 504 may include a central hub which extends through an annular center ring of the front phasing plug 502. As described with respect to FIGS. 2-3B, the second voice coil 132 and the third voice coil 112 may annularly surround the annular center ring of the front phasing plug 502. Additional elements of the coaxial loudspeaker 100 are described with respect to FIGS. 2-3B.

FIG. 2 shows a cross-sectional view 200 of the coaxial loudspeaker 100 of FIG. 1. As described with respect to FIG. 1, the coaxial loudspeaker 100 includes the low-mid section 120 and the high frequency section 122. Elements of FIG. 1 which are included in FIG. 2 may be equivalently numbered and may not be reintroduced for brevity.

Each of the first magnet 144 and the second magnet 134 may be permanent magnets which generate a permanent magnetic field. For example, the first magnet 144 may generate a first permanent magnetic field and the second magnet 134 may generate a second permanent magnetic field. Each of the first permanent magnetic field and the second permanent magnetic field may be radially oriented. Permanent magnetic fields generated by the first magnet 144 and the second magnet 134 are further described with respect to FIG. 3B.

The coaxial loudspeaker 100 may receive an input of electrical signals at connections, such as contacts 222 of the high frequency section 122 of the dual compression driver 124, as shown in FIG. 2. In some embodiments, the coaxial loudspeaker 100 may include at least two contacts 222. Each contact 222 may be coupled to at least one voice coil of the first voice coil 142, the second voice coil 132, and the third voice coil 112, such that each voice coil may receive electrical signal.

Turning to FIG. 3A, a detailed view 300 of the dual compression driver 124 of the coaxial loudspeaker 100 is shown. Elements of FIGS. 1-2 which are shown in FIG. 3A are equivalently numbered and may not be reintroduced. The detailed view 300 shows positioning of each of the first voice coil 142, the second voice coil 132, and the third voice coil 112 in a respective voice coil gap. When a voice coil of the first voice coil 142, the second voice coil 132, and the third voice coil 112 is provided with an electrical signal, a magnetic field may be induced at the respective voice coil. Interaction of an induced magnetic field with an adjacent permanent magnetic field of a respective magnet may cause motion (e.g., oscillation) of the voice coil in the respective voice coil gap along the central axis 102, thus oscillating a coupled diaphragm and producing sound waves (e.g., acoustic signals).

The detailed view 300 shows positioning of the first voice coil 142 in a first voice coil gap 340, the second voice coil 132 in a second voice coil gap 330, and the third voice coil 112 in a third voice coil gap 310. The first voice coil gap 340 may be formed as a space between the rear top plate 136 and the pole piece 138*a* of the rear back plate 138, with the first voice coil 142 positioned therein. The first voice coil gap 340 is therefore positioned above the first magnet 144 (e.g., between the first magnet 144 and the output side 152 of the coaxial loudspeaker 100). The first voice coil 142 may be formed as windings of a conductive material, such as copper wire, around the pole piece 138*a*. Electrical signal may be provided to the first voice coil 142 via a coupling of at least one contact 222. When the first voice coil 142 receives an electrical signal, a first electromagnetic field (EMF) may be induced at the first voice coil 142. The first voice coil gap 340, and therefore the first voice coil 142 may be positioned in proximity to the first magnet 144, such that a first permanent magnetic field of the first magnet 144 interacts with the first induced magnetic field (e.g., the first EMF) of the first voice coil 142.

Briefly turning to FIG. 3B, a detailed cross-sectional view 350 of the dual compression driver 124 is shown. The first permanent magnetic field may be radially oriented and is represented in part by a first plurality of arrows 312. As shown by a first arrow 312*a*, the first permanent magnetic field passes through the first voice coil gap 340 and therefore interacts with the first induced magnetic field of the first voice coil 142 positioned therein. The first magnet 144 may be configured such that the first permanent magnetic field may extend into the first voice coil gap 340 and may not extend into the second voice coil gap 330 and/or the third voice coil gap 310. For example, the first magnet 144 may have a first thickness 344 (e.g., along the y-axis, with respect to the axis system 150), which may allow the first permanent magnetic field to extend axially and radially into the first voice coil gap 340 and may not extend a further axial distance into at least one of the second voice coil gap 330 and the third voice coil gap 310. Additionally or alternatively, the first magnet 144 may be formed of a material which may provide the first permanent magnetic field which extends axially and radially into the first voice coil gap 340 and may not extend a further axial distance (e.g., towards the front of the dual compression driver 124) into the second voice coil gap 330 and/or the third voice coil gap 310.

Due to interaction of the first permanent magnetic field of the first magnet 144 and the first induced magnetic field of the first voice coil 142, the first voice coil 142 may oscillate axially along the pole piece 138*a* (e.g., along the central axis 102) within the first voice coil gap 340. In other words, the pole piece 138*a* may be stationary and the first voice coil 142 may oscillate axially along an exterior of the pole piece 138*a* (e.g., axial motion may be induced by interaction of the first permanent magnetic field and the first induced magnetic field). As described above, the first voice coil 142 may be coupled to the first diaphragm 140, which is configured to reproduce sounds in the high frequency range. Oscillation of the first voice coil 142 may therefore result in oscillation of the first diaphragm 140.

Returning to FIG. 3A, the dual compression driver 124 further comprises the second driver assembly, which spans the low-mid section 120 and the high frequency section 122. The second voice coil gap 330 may be formed as a space between the front back plate 128 and the phasing plug 108 (e.g., the front phasing plug 502), with the second voice coil 132 positioned therein. The second voice coil 132 may be formed as windings of a conductive material, such as copper wire, and may annularly surround a voice coil former which annularly surrounds the front phasing plug 502. Electrical signal may be provided to the second voice coil 132 via a coupling of at least one contact 222. When the second voice coil 132 receives an electrical signal, a second electromagnetic field may be induced at the second voice coil 132. The second voice coil gap 330, and therefore the second voice coil 132 may be positioned in proximity to the second magnet 134, such that a second permanent magnetic field of the second magnet 134 interacts with the second induced magnetic field (e.g., the second EMF) of the second voice coil 132.

The third voice coil 112 and the voice coil former 118 of the third driver assembly may extend into a central region of the front top plate 126, as described above. The third voice coil gap 310 may be formed as a space between the front top plate 126 and the front phasing plug 502, with the third voice coil 112 and the voice coil former 118 positioned therein. The third voice coil 112 may be formed as windings of a conductive material, such as copper wire, and may annularly surround the voice coil former 118, which annularly surrounds the phasing plug 108. Electrical signal may be provided to the third voice coil 112 via a coupling of at least one contact 222. When the third voice coil 112 receives an electrical signal, a third electromagnetic field may be induced at the third voice coil 112. The third voice coil gap 310, and therefore the third voice coil 112, may be positioned in proximity to the second magnet 134, such that the second permanent magnetic field of the second magnet 134 interacts with the third induced magnetic field (e.g., the third EMF) of the third voice coil 112.

As described herein, the third voice coil gap 310 is positioned above a gap between an interior of the second magnet 134 (e.g., a central space of the annularly shaped second magnet 134) and the phasing plug 108, (e.g., between the second magnet 134 and the output side 152 of the coaxial loudspeaker 100) where the phasing plug 108 is positioned in the central space of the annularly shaped second magnet 134. The second voice coil gap 330 is positioned below the second magnet 134 (e.g., where the second magnet 134 is positioned axially between the second voice coil gap 330 and the output side 152 of the coaxial loudspeaker 100) and radially closer to the central axis 102 than the third voice coil gap 310. As described with respect to FIG. 3B, both the third voice coil gap 310 and the second voice coil gap 330 are positioned such that the second permanent magnetic field may interact with respective magnetic fields induced at each of the second voice coil 132 and the third voice coil 112 when electrical signals are provided thereto.

Returning to FIG. 3B, the detailed cross-sectional view 350 of the dual compression driver 124 is shown. The second permanent magnetic field may be radially oriented and is represented in part by a second plurality of arrows 314. As shown by a second arrow 314*a,* the second permanent magnetic field passes through the second voice coil gap 330 and therefore interacts with the second induced magnetic field of the second voice coil 132 positioned in the second voice coil gap 330. As shown by a third arrow 314*b,* the second permanent magnetic field further passes through the third voice coil gap 310 and interacts with the third induced magnetic field of the third voice coil 112 positioned in the third voice coil gap 310.

The second magnet 134 may be configured such that the second permanent magnetic field may extend into the second voice coil gap 330 and the third voice coil gap 310 and may not extend into the first voice coil gap 340. For example, the second magnet 134 may have a second thickness 334, which may allow the second permanent magnetic field to extend axially and radially into the second voice coil gap 330 and the third voice coil gap 310, and may not extend a further axial distance (e.g., towards the rear of the dual compression driver 124) into the first voice coil gap 340. Additionally or alternatively, the second magnet 134 may be formed of a material which may provide the second permanent magnetic field which extends axially and radially into the second voice coil gap 330 and the third voice coil gap 310, and may not extend a further distance axially into the first voice coil gap 340.

As described above, the first permanent magnetic field may be smaller, or cover a smaller area, than the second permanent magnetic field. For example, the second magnet 134 may be stronger than the first magnet 144. The first magnet 144 and the second magnet 134 may be formed of different materials, such that the second magnet 134 may produce a stronger magnetic field than the first magnet 144. Additionally or alternatively, the first magnet 144 and the second magnet 134 may be formed of the same material. In the embodiment shown in FIG. 3B, the first permanent magnetic field may have a first direction and the second permanent magnetic field may have a second direction. The first direction and the second direction may be opposite each other. For example, the first permanent magnetic field may be polarized in a counter clockwise direction, and the second permanent magnetic field may be polarized in a clockwise direction. In other embodiments, the first permanent magnetic field may be polarized in the clockwise direction and the second permanent magnetic field may be polarized in the counter clockwise direction. In further embodiments, the first permanent magnetic field and the second permanent magnetic field may be polarized in the same direction, either clockwise or counter clockwise.

Positioning the second magnet 134 in proximity to the second voice coil gap 330 and the third voice coil gap 310, such that the second permanent magnetic fields extends into both the second voice coil gap 330 and the third voice coil gap 310 to interact with the second induced magnetic field and the third induced magnetic field, respectively, allows a single magnet (e.g., the second magnet 134) to be used for reproduction of sound in the high frequency and low-mid frequency audio range. The first magnet 144 is placed in proximity to the first voice coil gap 340 such that the first permanent magnetic field extends into the first voice coil gap 340 and not into the second voice coil gap 330 or the third voice coil gap 310. The first permanent magnetic field thus interacts with the first induced magnetic field to reproduce sound in the high frequency range. The acoustic signals generated by the first diaphragm 140 and the second diaphragm 130 propagate throughout the interior of the dual compression driver 124 and exit the coaxial loudspeaker 100 guided by the phasing plug 108 and the third diaphragm 110. In this way, low-mid and high frequency sound may propagate from the coaxial loudspeaker 100 in a same, first direction along the central axis 102. Using the dual compression driver 124, and therefore the first driver assembly and the second driver assembly, to reproduce sound in the high frequency range may provide increased power handling, lower thermal compression, provide a smoother frequency response, and decrease non-linear distortion and sub-harmonics, compared to a conventional single compression driver. Compared to other coaxial loudspeaker embodiments which use three magnets (e.g., two magnets of a dual compression driver and a third magnet of a direct-radiating cone diaphragm-based transducer) to reproduce sound in the high frequency and low-mid frequency audio ranges, the coaxial loudspeaker 100 described herein may have a less complex configuration and be less costly, as the coaxial loudspeaker 100 uses two magnets (e.g., less components) to produce sounds in the low, mid-, and high frequency ranges.

Turning now to FIG. 4, a graph 400 is shown which compares magnetic flux density norm in each of the first voice coil gap 340, the second voice coil gap 330, and the third voice coil gap 310. An arc length in millimeters (mm) is shown along the abscissa and magnetic flux density norm in Tesla (T) is shown along the ordinate. As described above, the first permanent magnetic field generated by the first magnet 144 interacts with the first induced magnetic field of the first voice coil 142 in the first voice coil gap 340, the second permanent magnetic field generated by the second magnet 134 interacts with the second induced magnetic field of the second voice coil 132 in the second voice coil gap 330, and the second permanent magnetic field further interacts with the third induced magnetic field of the third voice coil 112 in the third voice coil gap 310. Each of the first permanent magnetic field and the second permanent magnetic field may have different strengths, which may be represented in FIG. 3B as an axial and radial range of the permanent magnetic fields (e.g., of the first plurality of arrows 312 and the second plurality of arrows 314). Interaction of the first permanent magnetic field and the second permanent magnetic field with respective induced magnetic fields may be observed as magnetic flux density, as described herein.

A first plot 440 illustrates magnetic flux density of the first voice coil gap 340, a second plot 430 illustrates magnetic flux density of the second voice coil gap 330, and a third plot 410 illustrates magnetic flux density of the third voice coil gap 310. Magnetic flux density of the first voice coil gap 340 (e.g., the first plot 440) and the second voice coil gap 330 (e.g., the second plot 430) are similar. At an arc length of less than 5 mm, magnetic flux density of the first voice coil gap 340 (e.g., the first plot 440) increases from approximately 0.1 T to approximately 1.6 T. At an arc length of approximately 6 mm, the magnetic flux density of the first voice coil gap 340 peaks at greater than 1.7 T and as the arc length continues to increase beyond 6 mm, the magnetic flux density of the first voice coil gap 340 decreases to approximately 0.15 at an arc length of 11 mm. At an arc length of less than 5 mm, the magnetic flux density of the second voice coil gap 330 (e.g., the second plot 430) increases from approximately 0.4 T at an arc length of 1 mm to approximately 1.7 T at an arc length of 5 mm. As the arc length continues to increase, the magnetic flux density of the second voice coil gap 330 decreases from approximately 1.7 T to approximately 0.175 T at an arc length of 11 mm.

The third voice coil gap 310 (e.g., the third plot 410) may have a different magnetic flux density compared to the first voice coil gap 340 and the second voice coil gap 330, as a structure of the third voice coil gap 310 is based on a direct-radiating cone diaphragm transducer for a woofer-midrange (e.g., the third diaphragm 110), as described above. At an arc length of less than 3 mm, the magnetic flux density increases from approximately 0.2 mm to 1.1 mm. The magnetic flux density may be approximately equal to 1.1 mm for an arc length of approximately 3 mm to approximately 9 mm. As the arc length continues to increase, the magnetic flux density may decrease to approximately 0.5 mm at an arc length of 12 mm.

Magnetic flux density of a voice coil gap may be determined based on a permanent magnetic field strength and an induced magnetic field strength. Each of the first voice coil 142, the second voice coil 132, and the third voice coil 112 may be configured (e.g., material, number of windings) such that interaction of a respective induced magnetic field and a respective permanent magnetic field results in approximately equivalent magnetic flux density for the first voice coil gap 340 and the second voice coil gap 330, and magnetic flux density of the third voice coil gap 310 is less than that of the first voice coil gap 340 and the second voice coil gap 330. Different amounts of magnetic flux may be used to reproduce different frequency sound waves. For example, magnetic flux density of the first voice coil gap 340 and the second voice coil gap 330 may be approximately equal, as both the first voice coil gap 340 and the second voice coil gap 330 are used to reproduce sound in the high frequency range. Magnetic flux density of the third voice coil gap 310 may be less than that of the first voice coil gap 340 and the second voice coil gap 330, as the third voice coil gap 310 is used to reproduce sound in the low-mid frequency range.

Turning now to FIGS. 6-8, perspective views of a second embodiment 602 of the coaxial loudspeaker 100 are shown. The second embodiment 602 may be an embodiment of the coaxial loudspeaker 100 of FIGS. 1-3B, 5, and may be equivalently configured. Elements of the second embodiment 602 which are equivalent to elements of the coaxial loudspeaker 100 and are shown in FIGS. 6-8 are similarly numbered. For example, FIG. 6 shows a first perspective view 600 of the second embodiment 602 resting on an output side 152. The second embodiment 602 further includes a dual compression driver 124, which spans a low-mid section 120 and a high frequency section 122. FIG. 7 shows a second perspective view 700 of the second embodiment 602, where an outlet of the dual compression driver 124 (e.g., a phasing plug 108) may be visualized. High frequency sounds generated by the dual compression driver may propagate from the outlet of the dual compression driver 124 and be guided in part by the third diaphragm 110, which is coupled to a frame 104 by a surround 106. FIG. 8 shows a top-down view 800 of the second embodiment 602. The frame 104 of the second embodiment 602 may include a plurality of coupling points 802, 804, 806, and 808, which may be used to couple the second embodiment 602 to a speaker housing, audio system, and so on.

FIG. 9 illustrates a method 900 for a loudspeaker, such as the coaxial loudspeaker 100 and/or the second embodiment 602 of the coaxial loudspeaker 100. The method 900 comprises applying an electrical signal to a contact and translating the electrical signal into acoustic signals (e.g., which may be interpreted as sound) using each of a first voice coil, a second voice coil, a third voice coil, a first diaphragm, a second diaphragm, a third diaphragm, a first magnet, and a second magnet. The method 900 shall be described with respect to FIGS. 1-8, and may be applied to other embodiments without departing from the scope of the disclosure.

At 902, the method 900 includes applying an electrical signal to a contact. The electrical signal may be sourced from an amplifier, which may be coupled to the contact, such as at least one of the contacts 222, via a wire or other sufficient coupling through which the electrical signal may flow.

At 904, the method 900 includes flowing the electrical signal to a voice coil. The contact may be coupled to at least one of a first voice coil, a second voice coil, and a third voice coil, such as the first voice coil 142, the second voice coil 132, and the third voice coil 112, respectively. The contact may be coupled to at least one of the first voice coil, the second voice coil, and the third voice coil via a wire or other sufficient coupling through which the electrical signal may flow. When the electrical signal is applied to a voice coil, a magnetic field may be generated at the voice coil (e.g., an induced magnetic field).

At 906, the method 900 includes translating the electrical signal into an acoustic signal using a first magnet and a second magnet. Each of the first magnet (e.g., the first magnet 144) and the second magnet (e.g., the second magnet 134) may be permanent magnets which have a first permanent magnetic field and a second permanent magnetic field, respectively. The first permanent magnetic field may interact with a first induced magnetic field of the first voice coil in a first voice coil gap. Interaction of the first permanent magnetic field and the first induced magnetic field may induce axial motion of the first voice coil. The first voice coil may be coupled to a first diaphragm which is configured to reproduce sounds in the high frequency spectrum. Axial motion (e.g., oscillation) of the first voice coil may induce oscillation of the first diaphragm, generating sounds in the high frequency spectrum based on the electrical signals. The second permanent magnetic field may interact with a second induced magnetic field of the second voice coil in a second voice coil gap and with a third induced magnetic field of the third voice coil in a third voice coil gap. Interaction of the second permanent magnetic field and the second induced magnetic field may induce axial motion of the second voice coil. The second voice coil may be coupled to a second diaphragm which is configured to reproduce sounds in the high frequency spectrum. Axial motion (e.g., oscillation) of the second voice coil may induce oscillation of the second diaphragm, generating sounds in the high frequency spectrum based on the electrical signals. Interaction of the second permanent magnetic field and the third induced magnetic field may induce axial motion of the third voice coil. The third voice coil may be coupled to a third diaphragm which is configured to reproduce sounds in the low-mid frequency spectrum. Axial motion (e.g., oscillation) of the third voice coil may induce oscillation of the third diaphragm, generating sounds in the low-mid frequency spectrum based on the electrical signals.

At 908, the method 900 includes outputting acoustic signals, which may be interpreted as sound, in a low-mid frequency range and a high frequency range. Acoustic signals in the low-mid frequency range may be generated by the third diaphragm based on interaction of the third induced magnetic field and the second permanent magnetic field. Acoustic signals in the high frequency range may be generated by the first diaphragm based on interaction of the first induced magnetic field and the first permanent magnetic field, as well as generated by the second diaphragm based on interaction of the second induced magnetic field and the second permanent magnetic field. Acoustic signals in the low-mid frequency range may be directly output by the third diaphragm, which may be configured as a cone diaphragm. Acoustic signals in the high frequency range may propagate through a short horn structure formed by a phasing plug and may be further directed out of the loudspeaker by the cone diaphragm. In this way, sounds in the low-mid and high range frequency spectrum may be generated using two magnets, three voice coils, and three diaphragms, where two of the three diaphragms are configured to generate high frequency sound and one of the three diaphragms is configured to generate low-mid frequency sound.

The disclosure also provides support for a coaxial loudspeaker configured with a dual compression driver and a cone diaphragm. The dual compression driver may include a first driver assembly and a second driver assembly, each of which include a magnet, a voice coil, a voice coil gap, and a diaphragm. The dual compression driver may be coupled to a third driver assembly which includes the cone diaphragm, a voice coil, and a voice coil gap. The third driver assembly and the dual compression driver may be coupled in such a way that the second driver assembly is positioned between the first driver assembly and the third driver assembly. Within the first driver assembly, a first magnet may generate a first magnetic field in a first voice coil gap to energize a first voice coil, which may oscillate a first diaphragm to generate sound waves in the high frequency spectrum. Within the second driver assembly, a second magnet may generate a second magnetic field in a second voice coil gap to energize a second voice coil, which may oscillate a second diaphragm to generate sound waves in the high frequency spectrum (e.g., axial motion may be induced by interaction of the second permanent magnetic field and the second induced magnetic field). The second magnetic field may extend into a third voice coil gap of the third driver assembly and may thus energize a third voice coil to oscillate the cone diaphragm to generate sound waves in a low-mid frequency spectrum (e.g., axial motion may be induced by interaction of the second permanent magnetic field and the third induced magnetic field). In this way, two magnets (e.g., of the first driver assembly and the second driver assembly) and the cone diaphragm may be used to generate sound waves in the high frequency spectrum and in the low-mid frequency spectrum.

In a further embodiment, a dual compression driver includes a first magnet assembly including an annular first air gap, a first voice coil assembly axially movable in the first air gap, a first diaphragm coupled to the first voice coil assembly, a second magnet assembly including an annular second air gap, a second voice coil assembly axially movable in the second air gap, and a second diaphragm coupled to the second voice coil assembly. The dual compression driver is coupled to a third driver assembly including an annular third air gap, a third voice coil assembly axially movable in the third air gap, and a third diaphragm attached to the third voice coil assembly. The first voice coil assembly may be axially movable by a first magnetic field generated by the first magnet assembly in the annular first air gap. The second voice coil assembly and the third voice coil assembly may be axially movable by a second magnetic field generated in the annular second air gap and the annular third air gap, respectively.

The disclosure also provides support for a loudspeaker, comprising a compression driver having a first diaphragm assembly including a first magnet, and a first diaphragm coupled to a first voice coil, and a second diaphragm assembly including a second magnet and a second diaphragm coupled to a second voice coil, and a third diaphragm assembly including a third diaphragm coupled to a third voice coil. In a first example of the system, the first magnet drives the first diaphragm via the first voice coil and the second magnet drives the second diaphragm via the second voice coil and further drives the third diaphragm via the third voice coil. In a second example of the system, optionally including the first example, the first diaphragm, the second diaphragm, and the third diaphragm are positioned along a central linear axis, such that sound emitted by each of the first diaphragm, the second diaphragm, and the third diaphragm is emitted in a first direction and the loudspeaker is a coaxial loudspeaker. In a third example of the system, optionally including one or both of the first and second examples, the loudspeaker is a two-way coaxial loudspeaker. In a fourth example of the system, optionally including one or more or each of the first through third examples, the third diaphragm is configured to reproduce sound in a low-mid frequency range. In a fifth example of the system, optionally including one or more or each of the first through fourth examples, the third diaphragm is a cone diaphragm. In a sixth example of the system, optionally including one or more or each of the first through fifth examples, the second diaphragm and the first diaphragm of the compression driver are configured to reproduce sound in a high frequency range. In a seventh example of the system, optionally including one or more or each of the first through sixth examples, an electrical signal is applied to the loudspeaker via at least one contact, and the electrical signal induces motion of the first voice coil, the second voice coil, and the third voice coil along a central linear axis. In an eighth example of the system, optionally including one or more or each of the first through seventh examples, motion of the first voice coil generates a first electromagnetic field (EMF), motion of the second voice coil generates a second EMF, and motion of the third voice coil generates a third EMF. In a ninth example of the system, optionally including one or more or each of the first through eighth examples, the first magnet generates a first magnetic field and the second magnet generates a second magnetic field. In a tenth example of the system, optionally including one or more or each of the first through ninth examples, interaction of the first EMF and the first magnetic field oscillate the first diaphragm, interaction of the second EMF and the second magnetic field oscillate the second diaphragm, and interaction of the third EMF and the second magnetic field oscillate the third diaphragm.

The disclosure also provides support for a loudspeaker, comprising: a first voice coil gap, a second voice coil gap, and a third voice coil gap, wherein a first magnet creates a first magnetic field in the first voice coil gap and a second magnet creates a second magnetic field in the second voice coil gap and the third voice coil gap. In a first example of the system, the first magnet is included in a first diaphragm assembly which further includes a first voice coil and a first diaphragm, the second magnet is included in a second diaphragm assembly which further includes a second voice coil and a second diaphragm, and the loudspeaker further comprises a third diaphragm assembly which includes a third voice coil and a third diaphragm. In a second example of the system, optionally including the first example, the first voice coil gap is formed between a rear top plate and a pole piece of a rear back plate, the second voice coil gap is formed between a front back plate and a phasing plug, and the third voice coil gap is formed between a front top plate and the phasing plug. In a third example of the system, optionally including one or both of the first and second examples, the first voice coil is positioned in the first voice coil gap, the second voice coil is positioned in the second voice coil gap, and the third voice coil is positioned in the third voice coil gap. In a fourth example of the system, optionally including one or more or each of the first through third examples, the first magnetic field drives oscillation of the first diaphragm and the second magnetic field drives oscillation of the second diaphragm and the third diaphragm.

The disclosure also provides support for a method for a loudspeaker, comprising applying an electrical signal to a contact, wherein the contact is coupled to a first voice coil, a second voice coil, and a third voice coil, translating the electrical signal into an acoustic signal using a first magnet and a second magnet, and outputting the acoustic signal in a low-mid frequency range and a high frequency range. In a first example of the method, the electrical signal generates a first electromagnetic field (EMF) at the first voice coil, a second EMF at the second voice coil, and a third EMF at the third voice coil. In a second example of the method, optionally including the first example, the first magnet generates a first magnetic field which interacts with the first EMF to oscillate a first diaphragm coupled to the first voice coil. In a third example of the method, optionally including one or both of the first and second examples, the second magnet generates a second magnetic field which interacts with the second EMF to oscillate a second diaphragm coupled to the second voice coil and wherein the second magnetic field further interacts with the third EMF to oscillate a third diaphragm coupled to the third voice coil.

The description of embodiments has been presented for purposes of illustration and description. Suitable modifications and variations to the embodiments may be performed in light of the above description or may be acquired from practicing the methods. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and preceded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A loudspeaker, comprising:

a compression driver having a first diaphragm assembly including a first magnet, and a first diaphragm coupled to a first voice coil, and a second diaphragm assembly including a second magnet and a second diaphragm coupled to a second voice coil; and a third diaphragm assembly including a third diaphragm coupled to a third voice coil, wherein motion of the first voice coil generates a first electromagnetic field (EMF), motion of the second voice coil generates a second EMF, and motion of the third voice coil generates a third EMF;

wherein the first magnet generates a first magnetic field and the second magnet generates a second magnetic field; and wherein interaction of the first EMF and the first magnetic field oscillate the first diaphragm, interaction of the second EMF and the second magnetic field oscillate the second diaphragm, and interaction of the third EMF and the second magnetic field oscillate the third diaphragm.

2. The loudspeaker of claim 1, wherein the first magnet drives the first diaphragm via the first voice coil and the second magnet drives the second diaphragm via the second voice coil and further drives the third diaphragm via the third voice coil.

3. The loudspeaker of claim 2, wherein the first diaphragm, the second diaphragm, and the third diaphragm are positioned along a central linear axis, such that sound emitted by each of the first diaphragm, the second diaphragm, and the third diaphragm is emitted in a first direction and the loudspeaker is a coaxial loudspeaker.

4. The loudspeaker of claim 2, wherein the loudspeaker is a two-way coaxial loudspeaker.

5. The loudspeaker of claim 1, wherein the third diaphragm is configured to reproduce sound in a low-mid frequency range.

6. The loudspeaker of claim 5, wherein the third diaphragm is a cone diaphragm.

7. The loudspeaker of claim 1, wherein the second diaphragm and the first diaphragm of the compression driver are configured to reproduce sound in a high frequency range.

8. The loudspeaker of claim 1, wherein an electrical signal is applied to the loudspeaker via at least one contact, and the electrical signal induces motion of the first voice coil, the second voice coil, and the third voice coil along a central linear axis.

9. A loudspeaker, comprising:

a first voice coil gap;

a second voice coil gap; and a third voice coil gap, wherein a first magnet creates a first magnetic field in the first voice coil gap and a second magnet creates a second magnetic field in the second voice coil gap and the third voice coil gap; and wherein the first voice coil gap is formed between a rear top plate and a pole piece of a rear back plate, the second voice coil gap is formed between a front back plate and a phasing plug, and the third voice coil gap is formed between a front top plate and the phasing plug.

10. The loudspeaker of claim 9, wherein the first magnet is included in a first diaphragm assembly which further includes a first voice coil and a first diaphragm, the second magnet is included in a second diaphragm assembly which further includes a second voice coil and a second diaphragm, and the loudspeaker further comprises a third diaphragm assembly which includes a third voice coil and a third diaphragm.

11. The loudspeaker of claim 10, wherein the first voice coil is positioned in the first voice coil gap, the second voice coil is positioned in the second voice coil gap, and the third voice coil is positioned in the third voice coil gap.

12. The loudspeaker of claim 10, wherein the first magnetic field drives oscillation of the first diaphragm and the second magnetic field drives oscillation of the second diaphragm and the third diaphragm.

13. A method for a loudspeaker, comprising:

applying an electrical signal to a contact, wherein the contact is coupled to a first voice coil, a second voice coil, and a third voice coil;

translating the electrical signal into an acoustic signal using a first magnet and a second magnet; and outputting the acoustic signal in a low-mid frequency range and a high frequency range, wherein the electrical signal generates a first electromagnetic field (EMF) at the first voice coil, a second EMF at the second voice coil, and a third EMF at the third voice coil;

wherein the second magnet generates a second magnetic field which interacts with the second EMF to oscillate a second diaphragm coupled to the second voice coil; and wherein the second magnetic field further interacts with the third EMF to oscillate a third diaphragm coupled to the third voice coil.

14. The method of claim 13, wherein the first magnet generates a first magnetic field which interacts with the first EMF to oscillate a first diaphragm coupled to the first voice coil.

* * * * *